United States Patent [19]

Frankel

[11] 4,131,715

[45] Dec. 26, 1978

[54] USE OF CHELATED METAL CATALYSTS FOR ACID/EPOXY POLYMER SYSTEMS

[75] Inventor: Lawrence S. Frankel, Jenkintown, Pa.

[73] Assignee: Rohm and Haas Company, Philadelphia, Pa.

[21] Appl. No.: 650,819

[22] Filed: Jan. 20, 1976

[51] Int. Cl.$^2$ .................. B32B 27/38; B32B 35/00; D02G 3/00

[52] U.S. Cl. .................. 428/413; 528/112; 260/823; 29/401 A; 29/401 E; 156/94; 260/836; 260/837 R; 427/140; 427/142; 427/355; 427/386; 428/63; 428/418

[58] Field of Search ............ 427/386, 142, 355, 140; 260/2 EP, 47 EP, 47 EC, 836, 912, 837 R, 2 EC; 428/413, 418, 542, 543, 63; 156/94; 29/401 R, 401 A, 401 E; 264/36

[56] References Cited

U.S. PATENT DOCUMENTS

| 2,795,523 | 6/1957 | Cobb et al. .................. 428/63 X |
| 2,801,228 | 7/1957 | Starck et al. ................ 260/47 EC |
| 3,105,826 | 10/1963 | Jaggard .................... 260/837 R |
| 3,107,226 | 10/1963 | Tonner et al. ............... 260/837 R |
| 3,424,699 | 1/1969 | Stark et al. .................. 260/2 EP |
| 3,624,032 | 11/1971 | Miyashiro et al. ............. 260/47 EC |
| 3,704,268 | 11/1972 | Wynstra et al. ............... 260/2 EP |
| 3,812,214 | 5/1974 | Markovitz .................... 260/2 EP |
| 3,923,571 | 12/1975 | Adki et al. ..................... 156/94 |
| 3,950,571 | 4/1976 | McBride et al. ................ 427/142 |

FOREIGN PATENT DOCUMENTS 994881  6/1965  United Kingdom .................... 427/386

OTHER PUBLICATIONS

Bruins, *Epoxy Resin Technology*, pp. 56 & 57 (1968).
Toboldt, *Automobile Body Rebuilding and Refinishing*, pp. 346 and 347 (1950).

Primary Examiner—Ronald H. Smith
Assistant Examiner—Thurman K. Page

[57] ABSTRACT

This application discloses a composition and a method for catalyzing and crosslinking of a polyepoxy compound and an acrylic resin containing carboxylic acid groups, the catalyst being in the form of a metal chelate, particularly of manganese, zinc or chromium. The compositions, when substantially freed of volatile solvent and adjusted to a viscosity resembling that of gunnable caulking compositions, are particularly well adapted as a replacement for the metallic body solder used in automobile manufacture to fill out imperfections, welded joints and the like, when applied thereto and cured.

14 Claims, No Drawings

USE OF CHELATED METAL CATALYSTS FOR ACID/EPOXY POLYMER SYSTEMS

The present invention is concerned with novel catalyzed compositions containing certain solid or liquid acid copolymers, and which are adapted to be mixed with solid or liquid polyepoxides for the preparation of thermosetting filling or coating compositions. The compositions, when adjusted to a viscosity resembling that of gunnable caulking compositions, are particularly well adapted to replace the conventional metallic body solder used to fill out imperfections in newly manufactured automobile bodies including joints, welding seams, spot welds, and the like. The composition is smoothed, cured, and if necessary, excess portions of the adhered compositions are mechanically removed.

It is known to employ amines and quaternary ammonium compounds as catalysts for the curing, to produce a thermoset resin, of a mixture of a resin-forming polymer or compound containing a plurality of epoxide groups (herein also referred to simply as a polyepoxide) and an addition copolymer of a mixture of copolymerizable monoethylenically unsaturated monomers containing a carboxylic acid, such as acrylic or methacrylic acid, or an anhydride of a dicarboxylic acid, such as maleic anhydride. However, compositions containing a mixture of such an addition copolymer and polyepoxide (which may contain solvent) are generally quite unstable when the usual amines, salts thereof, or quaternary ammonium salts are present as the catalyst. Thus, it is not unusual for the solution of acid or anhydride copolymer, polyepoxide and catalyst to gel in a period of one or two weeks time under normal conditions of storage.

It is also known to utilize metal chelates such as the acetylacetonates of various metals for catalyzing the reaction between a polyepoxide and a polyanhydride or to catalyze the curing of an epoxide. Patents disclosing using a metal chelate to catalyze the cure of an epoxy material or a polyepoxy material mixed with a polycarboxylic acid or polyanhydride include U.S. Pat. Nos. 2,801,228, 3,424,699, 3,624,032 and 3,812,214. The utilization of a metal chelate to effect simultaneous polymerization of an ethylenically unsaturated compound and crosslinking by a polyepoxy compound are shown in Volume 72 of Chemical Abstracts, abstract No. 13615r, and in U.S. Pat. No. 3,704,268. U.S. Pat. No. 3,867,354 discloses crosslinking of carboxy terminated polybutadiene with a mixture of epoxides having two or three epoxy groups along with, as a catalyst, a chromium complex derived from salicylic acid. The patent discloses as ineffective compounds of cobalt, vanadium, zinc, copper, nickel and manganese, present as various salts or as the acetylacetonates. Polybutadiene in the cis form has a glass transition temperature of −102° and in the random form has a glass transition temperature of about −80° C.; the rubbery "gumstock" would be unsuitable for the use contemplated here of giving a hard filling or coating. Patents showing curing a mixture of an acrylic resin containing carboxylic groups and a polyepoxy compound are British Pat. No. 994,881, and U.S. Pat. Nos. 3,105,826 and 3,107,226. They involve amine, amine-HBF$_4$, or quaternary ammonium compounds, as catalysts. The British patent discloses long term stability at ambient temperatures.

It has now been discovered that certain metal chelates are useful for providing a fast and efficient cure of the above mentioned copolymer/polyepoxy mixture at normal curing temperatures and yet allowing a composition containing the acid or anhydride copolymer, the polyepoxide, and the catalyst to be stored at normal room or ambient temperatures for a period of some months without undergoing gelation.

Based on the above discovery, the invention provides two-component compositions containing an acid copolymer and the catalyst, as well as three-component compositions containing an acid copolymer, polyepoxide, and the catalyst. The invention also provides a method of filling or coating substrates with the three-component composition. As will be more fully described later, the two-component compositions are intended for eventual admixture with a polyepoxide to produce the three-component compositions.

The two-component composition of the invention comprises (A) a linear addition copolymer containing carboxylic acid or dicarboxylic acid anhydride groups and which (1) is derived from a mixture of copolymerizable monoethylenically unsaturated monomers containing a dicarboxylic acid anhydride or an $\alpha,\beta$-ethylenically unsaturated carboxylic acid and (2) is capable of forming a thermoset resin by reaction with a resin-forming material containing a plurality of epoxy groups, and (B) a minor proportion by weight, based on the copolymer, of a catalyst for said reaction between the copolymer and said resin-forming polyepoxide. An organic solvent may be present.

The copolymers which are used in the compositions are preferably either (1) those containing from 5 to 45% by weight of an $\alpha,\beta$-monoethylenically unsaturated acid, especially acrylic acid, methacrylic acid, or (2) polycarboxylic ethylenically unsaturated acids such as itaconic acid, maleic acid, fumaric acid, crotonic acid, or aconitic acid, or (3) those containing 3 to 15% by weight of an acid anhydride, such as maleic anhydride, itaconic anhydride, citraconic anhydride, and dimethyl maleic anhydride. Of course, the copolymer may contain a mixture of acids up to a total amount of 45% by weight in the copolymer or a mixture of anhydrides up to 15% by weight in the copolymer. Preferably, the amount of acid is from 15 to 30% as (1) or (2) by weight of the copolymer. The balance of the copolymer may be formed of any monoethylenically unsaturated copolymerizable compound or a mixture thereof. Examples of comonomers that may be employed include styrene, vinyl toluene, methyl methacrylate, acrylonitrile, methacrylonitrile, vinyl acetate, vinyl chloride, vinylidene chloride, and other esters of an acid of the formula:

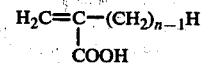

in which n is an integer having a value of 1 to 2, especially the esters with a saturated monohydric aliphatic alcohol having 1 to 18 carbon atoms. Examples of the latter monomers include methyl acrylate, ethyl acrylate, n-butyl acrylate, n-butyl methacrylate, 2-ethylhexyl acrylate and methacrylate, dodecyl acrylate and methacrylate, and octadecyl acrylate or methacrylate.

Preferred copolymers are those in which the non-acid portion thereof is derived from at least one ester of acrylic or methacrylic acid and a saturated $C_1$–$C_{18}$ monohydric aliphatic alcohol with, or without, vinyl toluene or styrene. An example of such a copolymer would be one in which the non-acid portion thereof is derived from methyl methacrylate and at least one alkyl acrylate.

Particular copolymers, for example, include a copolymer of 10 to 20% by weight of styrene, 10 to 20% by weight of acrylic acid, the balance being composed of ethyl acrylate or methyl acrylate; copolymers of 70 to 90% by weight of butyl acrylate with 30 to 10% by weight of acrylic acid; and copolymers of 10 to 20% by weight of methyl methacrylate or acrylonitrile with 10 to 25% by weight of acrylic acid or methacrylic acid, and the balance of ethyl acrylate to make 100% by weight in the copolymer. The number average molecular weight is 1,000 to 10,000.

The anhydride-containing copolymers employed in the present invention may be those formed of a mixture of 3% to 15% by weight of an unsaturated anhydride, preferably 7 to 12%, with an ester of methacrylic acid or of acrylic acid and, optionally, such mixtures containing acrylonitrile, styrene, vinyl toluene, or mixtures thereof. The balance of the copolymers may consist essentially of methyl methacrylate and another ester of methacrylic and/or acrylic acid with an alkanol having one to eighteen carbon atoms, preferably those having one to eight carbon atoms, or with cylohexanol. The copolymer may also contain styrene or vinyl toluene. The polymers may also contain up to about 15% by weight of acrylonitrile. For example, the polymers of the acid or anhydride and acrylonitrile with methyl methacrylate and methyl, ethyl, or butyl acrylate are contemplated, and such copolymers may also include styrene or vinyltoluene.

When an anhydride is used, the copolymer generally is prepared by a solution polymerization procedure in such a manner as to preserve the anhydride group. To do this, it is essential that the polymerization be carried out in solvents which do not decompose the anhydride group or hydrolyze it. This excludes the possibility of employing water or compounds containing amine groups, hydroxyl groups, or phenolic hydroxyl groups.

The epoxy compound employed in this invention can be any 1,2-epoxy resin having more than 1 epoxy group per molecule and includes cycloaliphatic epoxy resins, such as 3,4-epoxycyclohexylmethyl-(3,4-epoxy) cyclohexane carboxylate (sold under the trademarks ERL 4221 by Union Carbide Plastics Company or Araldite CY 179 by Ciba Products Company), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl) ether resins (sold under the trademark ERL 4205 by Union Carbide Plastics Company), 2-(3,4-epoxy) cyclohexyl-5,5-spiro (3,4-epoxy)-cyclohexane-m-dioxane (sold under the trademark Araldite CY 175 by Ciba Products Company); glycidyl ethers of polyphenol epoxy resins, such as liquid or solid bisphenol A diglycidyl ether epoxy resins (such as those sold under trademarks as Epon 826, Epon 828, Epon 830, Epon 1001, Epon 1002, Epon 1004, etc., by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidyl tetraphenylethane (Epon 1031 made by Shell Chemical Company); glycidyl ester epoxy resins such as diglycidyl phthalate (ED-5661 by Celanese Resins Company), diglycidyl tetrahydrophthalate (Araldite CY 182 by Ciba Products Company) and diglycidyl hexahydrophthalate (Araldite CY 183 made by Ciba Products Company or ED-5662 made by Celanese Resins Company); and flame retardant epoxy resins such as halogen containing bisphenol A diglycidyl ether epoxy resins (e.g., DER 542 and DER 511 which have bromine contents of 44-48 and 18-20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600 and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin.

Among the useful epoxides, are polyether derivatives of a polyhydric phenol containing epoxy groups which may be prepared by effecting reaction between a polhydroxy phenol or alcohol, for example, hydroquinone, resorcinol, glycerine, or condensation products of phenols with ketones, for instance, bis-(4-hydroxyphenyl)-2,2-propane, and epichlorohydrin. For example, the reaction of epichlorohydrin with bis(4-hydroxyphenyl)-2,2-propane may be formulated as follows:

$$n\text{-HO}\phi C(CH_3)_2\phi OH\text{-}n + ClCH_2CH\underset{O}{\overset{}{\diagdown\!\diagup}}CH_2 \longrightarrow$$

$$CH_2\text{---}CHCH_2(O\phi C(CH_3)_2\phi OCH_2CH(OH)CH_2)_n O\phi C(CH_3)_2\phi OCH_2CH\text{---}CH_2$$
$$\underset{O}{\diagdown\!\diagup} \qquad\qquad\qquad\qquad\qquad\qquad\qquad\qquad\qquad \underset{O}{\diagdown\!\diagup}$$

where $\phi$ is the phenylene group and n have an average value varying from around zero to about 7. These resins may be made by the method disclosed in U.S. Pat. Nos. 2,324,483 and 2,444,333 and in British Pat. Nos. 518,057 and 579,698. Many of these ethoxyline resins are sold under the name of "Epon" resins by Shell Chemical Corporation or the resins sold by the Ciba Company under the Registered Trade Mark "Araldite". Data on the Epon resins are given in the table below:

TABLE I

| Epon No. | Epoxide Equivalent | Approximate Esterification Equivalent | M.P., ° C. |
| --- | --- | --- | --- |
| RN-34 | 225–290 | 105 | 20–28 |
| RN-48 | 192 | 80 | 9 |
| 1064 | 300–375 | 105 | 40–45 |
| 1062 | 140–165 | — | Liquid |
| 1004 | 905–985 | 175 | 97–103 |
| 1007 | 1,600–1,900 | 190 | 127–133 |
| 1009 | 2,400–4,000 | 200 | 145–155 |
| 1001 | 450–525 | 130 | 64–76 |

Also, there may be used polyepoxides of the formula:

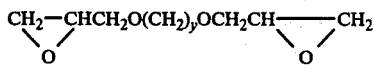

where y is a number having an average value of 2 to 4. Epon 562 is of this type, is liquid at normal room conditions, and has an "Epoxide Equivalent" value of 140-165. Also, a diepoxide or triepoxide of glycerol may be used. These aliphatic polyepoxides may be prepared in known fashion as described, for example, in U.S. Pat. Nos. 2,730,427 and 2,752,269. The preferred polyepoxides are those having average molecular weights of about 250 to 1,000.

The transition metal coordination compound or chelate catalytic hardening agent for the resin mixture is used in quantities of from about 0.025 to 6.0% by weight of the resin mixture. The chelate must be stable at ambient temperatures of up to about 22° C., preferably, 40° C., and decompose to release the metal at the curing temperature, of 100° C. to 250° C. Resin compositions containing the present hardeners possess a reactivity that can be controlled over an extremely wide range. The catalytic hardeners of the present invention possess a number of desirable characteristics. They are not decomposed or hydrolyzed by moisture, as is the case with known acid anhydrides and boron trifluoride-amine curing agents. They are nonvolatile. The hardening agents are useful with an extremely broad class of resins. The metal acetylacetonates, one class of chelates of the present invention, can be characterized by the following structural formula:

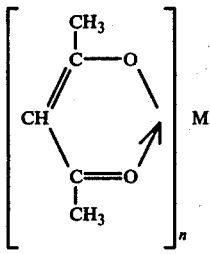

where M is a polyvalent transition metal ion and n is 2 to 4 corresponding to the valence number of the metal ion. Included within the scope of the invention are metal acetylacetonates in which one or more hydrogen atoms of the methyl or methylene groups are substituted by a halogen atom or by an alkyl, aryl, or an alkaryl substituent. An example of a halogen-substituted metal acetylacetonate is a metal hexafluoroacetylacetonate or trifluoroacetylacetonate. An example of an alkyl-substituted acetylacetonate is dipivaloylethane in which the three hydrogen atoms on each of the methyl groups are substituted with a methyl group. The catalytic hardeners of the present invention should not be confused with similar compositions containing labile halogen atom. In the present compositions, the halogens, if present, are attached directly to a carbon atom of the methylene or methyl groups, and are therefore extremely stable. Labile halogen atoms in epoxy resin curing agents normally form halogen acids, and the presence of such an ionic constituent in the cured resin would raise many problems including poor electrical properties.

Transition metal acetylacetonates in which the metal is chromium, manganese, zinc, or combinations thereof are a particularly preferred class of metal acetylacetonates within the scope of the invention. However, essentially any transition metal acetylacetonate may be used, including those of aluminum, cadmium, cerous, chromic, cobaltic, cobaltous, cupric, ferric, ferrous, hafnium, indium, lead, manganic, manganous, molybdenum, molybdenyl, nickel, palladium, platinum, thorium, titanium, tungstyl, uranyl, vanadium, vanadyl, zinc, and zirconium. Acetylacetonates of the rare earth elements, scandium, cerium, yttrium, lanthanum, praseodymium, neodynium, samarium, europium, gadolinium, terbium, dysprosium, holmium, erbium, thulium, ytterbium, and lutetium are known and can be expected to be useful in the practice of the present invention.

Other metal chelates or sequestrating agents in addition to the acetylacetonates are useful. One such material is a product whose common name is maneb, which is polymeric manganese ethylene-1,2-bis-dithiocarbamate, described in U.S. Pat. Nos. 2,504,404; 2,710,822; and 2,794,156. While this product is insoluble in most organic solvents, it is readily dispersed, as are pigments particularly where the viscosity of the putty like material of the present invention is such that it is in dispersed form as a finely divided powder in the acrylic polymer-epoxy polymer blend. Still another chelate is a related chemical whose common name is mancozeb, described in U.S. Pat. No. 3,379,610, which is a zinc and manganese complex of ethylene-1,2-bis-dithiocarbamate. Another related material is zineb, the zinc complex of ethylene-1,2-bis-dithiocarbamate. It is disclosed in U.S. Pat. No. 2,457,674.

Substantially any transition metal chelate of an organic compound which is stable at ambient temperatures up to about 22° C., preferably up to about 40° C., and decomposes at elevated temperatures such as from 100° C. to 250° C. is useful. The chelating agent may be bidentate, tridentate, tetradentate, pentadentate, hexadentate, and so forth. Among the chelating agents which are useful to prepare the metal chelates are complexes containing amino nitrogen including tetraethylene pentamine, pentaethylene hexamine, 5-sulfo-3-hydroxyquinamine, aminopolycarboxylic acids such as N-hydroxyethylimino diacetic acid, nitrilotriacetic acid, N,N,N',N'-ethylenediaminetetraacetic acid, N-hydroxyethyl-N,N',N'-ethylenediaminetriacetic acid, citric acid, salicylic acid, tartaric acid, gluconic acid, and the like; and bidentate amino acid ligands such as glycine, alanine, β-alanine, valine, propylaminoacetic acid, norvaline, α-aminobutyric acid, lucine, N-methylaminoacetic acid, N-ethylaminoacetic acid, dimethylaminoacetic acid, diethylaminoacetic acid, phenylanaline, proline and the like. Others include pyridine and the like.

The chelates are used in small catalytic quantities from 0.02 to 6.0%, based upon the combined weight of the epoxy resin and acrylic resin. Optimum results have been achieved with from 0.05 to 4.0%. It is important to note that the chelates of the invention are catalytic hardeners, which do not in a significant way become a part of the hardened polymer as do curing agents added in much larger or near stoichiometric amounts.

The finished solder substitute must be sufficiently hard to be sandable after a relatively short cure cycle.

The Shore hardness determined on a Shore A Durameter is a useful measurement. For thick section filler applications the necessary hardness after a 10 minute cure at 350° F. (176.7° C.) is from 50 to 100. The relative stability of the compositions is measured by a consistency test the details of which are as follows. A sample of compound and a 6-ounce polyethylene cartridge are conditioned for at least 16 hours at standard conditions. At the end of the conditioning period the cartridge with plunger in place is filled to capacity with compound from the nozzle end, and placed in an air-powered Semco caulking gun. A standard Semco nozzle with a ⅛ inch diameter orifice is attached to the cartridge. The compound is then gunned at 50 psi pressure into an empty pint container while a stopwatch is used to time the extrusion through the orifice. Gunning time is recorded in grams/min. extruded.

The catalyst may be mixed with the copolymer in any suitable organic solvent in which it, the addition copolymer and the polyepoxide are soluble; and such a mixture may be sold and/or shipped as such for admixture with a polyepoxide to form the final filler or coating composition. When the catalyst is mixed with the copolymer for later mixture with the polyepoxide, the amount of catalyst may be from about 0.04 to 10.0 parts by weight, preferably 0.4 to 4.0 parts, per 100 parts by weight of the copolymer. The concentration of the polymer in the solvent may be from about 1% up to saturation, but for most practical purposes, it is in the range of about 90 to 100% (solvent free). Organic solvents that may be employed include any suitable inert solvent such as the aromatic, naphthenic, or aliphatic hydrocarbons, including especially benzene, toluene, and xylenes, esters such as ethyl acetate, butyl acetate, amyl acetate, and 2-(ethoxy)ethyl acetate, ketones, such as acetone, methyl ethyl ketone, and methyl isobutyl ketone, ethers such as dioxane, the monomethyl ether of diethylene glycol, and so on.

In preparing the final composition for filler or coating purposes, the amount of polyepoxide incorporated may be from 5 to 200%, and preferably from about 40 to 120%, by weight, based on the weight of copolymer in the composition. As noted above, in the three-component mixture, the amount of curing catalyst may be from 0.025 to 6% or more based on the weight of copolymer and polyepoxide. The concentration of a solution of the three-component may be anywhere from 1% to saturation in the solvents mentioned hereinbefore or mixtures thereof. For body solder purposes, concentrations of 90 to 100% are generally required.

A composition containing the polyepoxide and copolymer as well as the catalyst may be partially co-reacted, short of the stage at which gelation occurs. Preferably, before application as a filler or coating, the polyepoxide, copolymer, and catalyst are simply mixed without such coreaction.

The compositions of the present invention, whether they contain a polyepoxide or not, are quite stable on storage, being adapted to last without severe gelation for a period of several months. The compositions containing copolymer, polyepoxide and catalyst, may be employed in known fashion for providing, on various substrates, fillers or coatings of outstanding impact resistance, particularly for the decoration of metals, wood, concrete, as a body solder, and so forth. After application to the substrate to be coated, the composition is dried, at room temperature or at an elevated temperature if a solvent is present, and is cured to effect reaction, or completion of the reaction, between the copolymer and polyepoxide whereby there results a thermoset resin. Curing may be effected at temperatures of 100° to 350° C. usually for a period of a few minutes, such as 3 to 10 minutes, at the upper temperature to one-half hour or more at the lower temperature. As suggested heretofore, for use as an automobile body "solder", the composition is free of volatile solvents and does not yield appreciative amounts of by-products upon curing that are volatile at the curing temperature. Since the hardening agents are used in minor catalytic amounts, some volatile by-products can be tolerated.

The compositions may be pigmented. They may also contain other materials, such as phenol-aldehyde, urea-aldehyde, or melamine-aldehyde resins, to the extent that such materials are compatible therewith. For example, the incorporation of 1 to 15% by weight of an aminoplast, such as butylated polymethylol-melamine, provides modified coatings having improved resistance to detergents.

Suitable pigments for body solder application include black colorants commonly used in the art.

The pigment to binder ratio is in the range of about 0 to 2.0, preferably 0.4 to 1.0. For filling or coatings, the composition is in liquid or even powdered form. For the preferred embodiment of the invention, as a substitute for a body solder, the viscosity without pigment is in the range of 50,000 to 500,000 at greater than 95% polymer solids.

Suitable fillers include calcium carbonate, colloidal silica, talc, calcite, mica, asbestos fiber or powder, diatomaceous earth, barytes, alumina, slate, calcium silicate, clay, magnesium carbonate, magnesium silicate, fumed silicas, etc.

The calculated glass transition temperature ($T_g$) of the acrylic polymer for body solder application is between $-45°$ C. and $20°$ C. preferably between $-35°$ C. and $-5°$ C. The glass transition temperature is a conventional criteria of polymer hardness and is described in Flory "Principles of Polymer Chemistry," pages 56 and 57 (1953), Cornell University Press. See also "Polymer Handbook", Brandup and Immergut, Section III, pages 61 –63 InterScience (1966). The $T_g$ may be measured or it may be calculated as described by Fox, Bulletin of the American Physics Society, Volume I, No. 3, page 123 (1956). The amount of solvent, if any, in the final body solder composition is in the range of 0 to 5.0%; the lower the quantity, the less shrinkage.

It is essential that the composition be adapted to cure in a manner of minutes, preferably no more than 10 minutes because of the demands of the assembly line production of automobile bodies. The difficulty with conventional epoxy-polymer combination frequently is that they require up to an hour to cure to a condition whereby sufficient cure is achieved so that marring of the surface does not occur by mechanical handling and movement. The following examples give presently known modes of carrying out the invention.

EXAMPLE 1

Preparation of Polymer butyl acrylate/methylmethacrylate/-acrylic acid in the Weight Ratios of 66.5/11.0/22.5

Reaction is carried out in a five liter, four necked round bottom flask equipped with a paddle stirrer, addition funnel, equipment for nitrogen sparging and a Y adapter fitted with a thermometer and two reflux condensers (in line). 2000 g. of cellosolve acetate is changed to the flask and heated with an oil bath to reflux (156° C.) under slow nitrogen sparge. The sparge is removed once reflux is attained. The initiator and monomers are combined as follows: 64.0 g Tupersol 70, 1048.0 g butyl acrylate (BA), 192.0 g methyl methacrylate (MMA) and 360.0 g glacial acrylic acid (AA). The composition is BA/MMA/AA 65.5/12/22.5 (wt. %) and the weight of Lupersol 70, which is 75% t-butylperacetate, gives 3 wt. % initiator based on monomer. The monomer solution is added to the refluxing system at a constant rate over a 3 hour period. The solution temperature varies from 150° C. at the onset of polymerization to 155° C. near the end of the addition. Reflux is maintained for 15 minutes after the completion of the addition and then a chaser solution of 10.6 g Lupersol 70 (0.5 wt. % initiator on monomer) in 460.0 g cellosolve acetate is added over 30 minutes. The system is then kept at reflux for an additional 15 minutes after the chaser addition. At this point, solids are determined to be 39.5% (conditions: 1 g sample at 150° C. for 1 hour). This value indicates essentially quantitative conversion of monomer.

After being cooled somewhat, the clear solution is transferred to a Buchler flask evaporator and stripped of solvent. Stripping is initially done at 100° C./20mm and then, as a final step, at 160° C./<1mm for 1 hour. The clear, yellow product material has solids of 99%. It flows only slightly at room temperature but becomes fluid when warmed. Gel permeation chromotography shows an $\overline{M}w$ of 2930 and an $\overline{M}n$ of 1620.

EXAMPLE 2

Preparation of Additional Polymer

Reaction is carried out in a five liter, four necked round bottom flask equipped with a paddle stirrer, addition funnel, equipment for nitrogen sparging and a Y adapter fitted with a thermometer and two reflux condensers (in line). Cellosolve acetate (2000.0 g) is charged to the kettle and heated with an oil bath to reflux (156° C.) under a slow nitrogen sparge, the sparge being discontinued once reflux is reached. The initiator and monomers are combined as follows: 64.0 g Lupersol 70, 1240.0 g butyl acrylate, 360.0 g glacial acrylic acid. The composition is butyl acrylate/acrylic acid 77.5/22.5 (wt. %) and the weight of Lupersol 70, which is 75% t-butylperacetate, gives 3 wt. % initiator, based on monomer. The monomer solution is added at a constant rate over a 3 hour period to the system maintained at reflux. The solution temperature varies from 151° C. at the start of the polymerization to 154° C. near the end of the addition. Reflux is maintained for 15 minutes after the completion of the addition and then a chaser solution of 10.6 g Lupersol 70 (0.5 wt. % initiator on monomer) in 460.0 g Cellosolve acetate is added over 30 minutes. The system is kept at reflux for 15 minutes following the chaser addition. At this point, solids are 39.7% (solids conditions: 1 g of sample/150° C./1 hr.), indicating essentially complete conversion of monomer.

The clear, fluid solution is cooled and then stripped on a Buchler flask evaporator. Stripping is done initially at 100° C./20mm and, for the final step, then at 160° C./<1mm for 1 hour. The clear, slightly amber product material has a solids content of 97.3%. The material flows at room tmperature. Molecular weights as determined by gel permeation chromotography are $\overline{M}w$ 2290 and $\overline{M}n$ 1360.

The polymers of Examples 1 and 2 have calculated glass transition temperatures of from about −10° C. to −30° C.

EXAMPLE 3

The polymer of Example 1 from which the solvent has been stripped, is blended with Epon-828, which has the composition

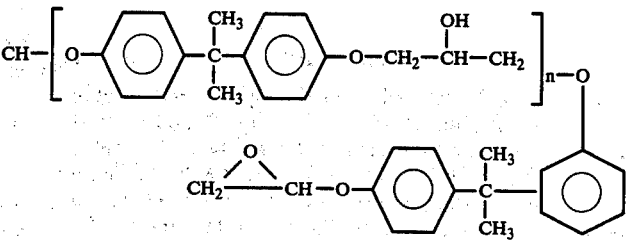

having a viscosity of 10,000–20,000 cp and wherein n = 1 to 2, in a weight ratio of 30 gms of the acrylic polymer to 20 gms of the epoxide, and transferred to a standard Semco polyethylene cartridge for subsequent stability studies. A portion of the material is extruded for cure rate studies.

The properties of the blend are shown in Table I.

TABLE I

| Catalyst | Wt. % Catalyst[d] | Tukon Hardness 15 min. 350° F. cure (176.7° C.) | Relative Stability[c] | | | | |
|---|---|---|---|---|---|---|---|
| | | | Initial | 3 day | 1 wk. | 2 wk. | 4 wk. |
| Amines | | | | | | | |
| DMP-30[a] | 1.2 | 1.2 | 1.00 | 0.23 | <0.10 | Gel | Gel |
| DMP-30[a] | 0.4 | 0.8 | 1.00 | 0.38 | 0.27 | <0.10 | Gel |
| Pyridine | 1.2 | 1.2 | 1.00 | <0.10 | Gel | Gel | Gel |
| Pyridine | 0.4 | 0.6 | 1.00 | 0.10 | Gel | Gel | Gel |
| Cu(pyridine)$_4$ (NO$_3$)$_2$ | 2.0 | 1.8 | 1.00 | 0.40 | 0.10 | Gel | Gel |
| (CH$_3$)$_3$NHCl | 1.2 | 0.8 | 1.00 | 0.60 | 0.22 | 0.10 | <0.10 |
| Strong Base | — | — | 1.00 | 0.38 | 0.10 | <0.10 | Gel |
| NaOCH$_3$[b] | | | | | | | |
| Metal Acetylacetonates | | | | | | | |
| Cr(AcAc)$_3$[e] | 4.0 | 1.3 | 1.00 | 0.60 | 0.67 | 0.65 | 0.50 |
| Cr(AcAc)$_3$ | 1.2 | 0.9 | 1.00 | 0.60 | 0.67 | 0.65 | 0.52 |
| Zn(AcAc) | 4.0 | 4.7 | 1.00 | — | 0.63 | 0.17 | <0.10 |
| Zn(AcAc) | 1.2 | 2.1 | 1.00 | 0.71 | 0.64 | 0.29 | 0.10 |
| Mn(AcAc)$_2$ | 4.0 | 4.3 | 1.00 | 1.00 | 0.76 | 0.45 | 0.26 |
| Mn(AcAc)$_3$ | 4.0 | 3.0 | 1.00 | 1.00 | 0.90 | 0.51 | 0.20 |

TABLE I-continued

| Catalyst | Wt. % Catalyst[d] | Tukon Hardness 15 min. 350° F. cure (176.7° C.) | Relative Stability[c] | | | | |
|---|---|---|---|---|---|---|---|
| | | | Initial | 3 day | 1 wk. | 2 wk. | 4 wk. |
| Control | 0.0 | <<0.1 | 1.00 | 0.60 | 0.65 | 0.65 | 0.60 |

[a]Composition is tris(dimethylaminoethyl)phenol
[b]25% methanol solution
[c]Stability is measured by extrudabilirty (consistency) test, described above.
[d]Based on the total weight of a polynmer blend of 60 parts of acrylic terpolymer and 40 parts of Epon 828.
[e]AcAc = acetylacetonate EXAMPLE 4 30 gms of the polymer of Example 2 containing 97.3% solids is blended with 20 gms of Epon 828 and 4 weight percent of the catalysts listed in Table II based on the total weight of the mixture. The composition is mixed in a container and transferred to a standard Semco polyethylene cartridge for subsequent stability studies. A 10 g portion of the material is extruded into an aluminum weighing dish for cure rate studies of thick sections (approximately ¼ inch).

The effects of various catalysts on the hardness and stability after curing the blend are shown in Table II.

TABLE II

| Catalyst | Hardness* 5 min. 350° F. cure | Hardness* 10 min. 350° F. cure | Relative Stability | | |
|---|---|---|---|---|---|
| | | | Initial | 1 week | 2 weeks |
| Cr(AcAc)$_3$ | 10 | 50 | 1.00 | 0.78 | 0.60 |
| Re(AcAc)$_3$ | 38 | 50 | 1.00 | 0.86 | 0.39 |
| Maneb | 60 | 80 | 1.00 | 0.86 | 0.60 |
| Mancozeb | 60 | 75 | 1.00 | 0.70 | 0.49 |
| Zineb | 10 | 45 | 1.00 | 0.63 | 0.32 |

*Shore A Durameter

EXAMPLE 5

Following the procedure of Example 4 and utilizing Epon 828 and the polymer of Example 2, and each as controls, with the following chelates indicated in Table III utilizing the chelates in the amount of 6.0% based on the weight of total polymer or epoxy or a combination of the two when heated at 176° C. for 15 minutes, the results are as follows:

TABLE III

| Chelate | Polymer of Ex. 2 | Epon 828 | Result |
|---|---|---|---|
| Cr(AcAc)$_3$ | X | — | No Reaction |
| Cr(AcAc)$_3$ | — | X | No Reaction |
| Maneb | X | — | No cure |
| Maneb | X | X | No cure |
| Cr(AcAc)$_3$ | X | X | Cures to solid polymer |
| Maneb | X | X | Cures to solid polymer |

This indicates that the epoxy polymer and the acrylic polymer are interacting to provide crosslinking, and the result is not just a simple crosslinking of an epoxy homopolymer. This latter conclusion is confirmed by U.S. Pat. No. 3,812,214, for instance at Example 12 in column 7, wherein Epon 828 resin is mixed with 2% titanium acetyl acetonate, based on resin, and heated at 160° C. for 2 hours. The epoxy resin did not gel under those conditions. Utilizing the same epoxy resin and same catalyst, when one or two parts of catechol were added in accordance with this patent, gelation occurred after 7 minutes at 160° C. and after one day at room temperature. With some of the chelates and epoxy resins disclosed in that patent it is possible to obtain a stable epoxy resin in the presence of a chelate at room temperature with gelation taking place upon heating. Thus, the present invention contemplates not only the sole crosslinking being between acrylic polymer and the acid groups of the acrylic polymer and the epoxy resin but also includes such crosslinking accompanied by some homopolymerization of the epoxy resin accomplished via amine and/or sequestered BF$_3$ complexes.

The neutral ligand 2,4-pentanedione (acetylactone) b.p. about 140° C. shows no catalytic effect.

The rate of reaction of epoxy groups with one another is different than the rate of reaction of an epoxy group with an acid group, depending on the catalyst utilized. For example, a mixture of acid acrylic polymer and Epon 828 plus BF$_3$ monoethyl amine will yield straight epoxy crosslinking. The same polymers, but with difference catalysts (chelated metals) yields the acid-epoxy reaction. Mixtures of catalysts (metal acetylacetonates and BF$_3$-amine catalysts, for example) may be used to give a balance of acrylic/epoxy crosslinking and epoxy homopolymerization.

The following claims set forth the subject matter which the applicant regards as his invention.

I claim:

1. An article of manufacture having adhered thereto a cured composition of a linear addition copolymer, containing carboxylic acid groups derived from a mixture of copolymerizable ethylenically unsaturated monomers containing a dicarboxylic acid anhydride or an α,β-ethylenically unsaturated acid, and a resin-forming epoxy compound containing a plurality of epoxide groups, reacted by means of a catalyst, in the amont of 0.04% to 10.0% by weight based on the weight of the addition copolymer, the catalyst being a transition metal chelate stable at ambient temperatures and which decomposes to release the chelated metal when heated to temperatures of above about 100° C, said composition, before curing, being substantially free of volatile solvent.

2. The article of manufacture of claim 1 having adhered thereto, in cured form, the composition wherein the copolymer is a copolymer of a monomer mixture containing from 5 to 45% by weight of one or more, α,β-ethylenically unsaturated carboxylic acids, the $T_g$ of the copolymer being from −45° C. to 20° C.

3. The article of manufacture of claim 2 having adhered thereto in cured form, a composition in which the acid is acrylic acid, methacrylic acid, or itaconic acid and a predominant proportion of the monomers in the copolymer is at least one ester of acrylic or methacrylic acid and an alcohol having 1 to 18 atoms, said addition copolymer having a $T_g$ of between −45° and +20° C., a number average molecular weight of between 1,000 and 10,000, having a viscosity of gunnable caulking compositions, and having a ratio of pigment to binder of 0.4 to 1.

4. An automobile body having adhered thereto in cured form a composition comprising a linear addition copolymer, containing carboxylic acid or dicarboxylic anhydride groups derived from a mixture of copolymerizable ethylenically unsaturated monomers containing a discarboxylic acid anhydride or an α,β-ethylenically unsaturated acid, reacted with a resin-forming epoxy compound containing a plurality of epoxide groups, by means of a catalyst in the amount of 0.04% to 10.0% by weight based on the weight of the addition copolymer, the catalyst being a transition metal chelate stable at ambient temperatures, and which decomposes to release the chelated metal when heated to temperatures of above about 100° C said composition, before curing, being substantially free of volatile solvent.

5. A process of filling or coating a substrate comprising the steps of applying thereto a composition comprising (1) a linear addition copolymer containing carboxylic acid or dicarboxylic anhydride groups derived from a mixture of copolymerizable ethylenically unsaturated monomers containing a dicarboxylic acid anhydride or an α,β-ethylenically unsaturated acid admixed with (2) a resin-forming epoxy compound containing a plurality of epoxide groups, and admixed with (3) a catalyst in the amount of 0.04% to 10.0% by weight based on the weight of the addition copolymer, the catalyst being a transition metal chelate stable at ambient temperatures up to about 22° C and which decomposes to release the chelated metal when heated to temperatures above about 100° C, and curing the mixture by heating the same to a temperature above about 100° C said composition, before curing, being substantially free of volatile solvent.

6. The process of claim 5 in which the copolymer is a copolymer of a monomer mixture containing from 5 to 45% by weight of one or more α,β-ethylenically unsaturated carboxylic acids, the $T_g$ of the copolymer being from −45° C. to 20° C.

7. The process of claim 6 in which the acid is acrylic acid, methacrylic acid, or itaconic acid and a predominant proportion of the monomers in the copolymer is at least one ester of acrylic or methacrylic acid and an alcohol having 1 to 18 carbon atoms, said addition copolymer having a $T_g$ of between −45° and +20° C., a number average molecular weight of between 1,000 and 10,000, said composition being substantially free of volatile solvent, having a viscosity of gunnable caulking compositions, and having a ratio of pigment to binder of 0.4 to 1.

8. The process of claim 7 wherein the copolymer is derived from a monomer mixture containing from 3 to 15% by weight of at least one dicarboxylic acid anhydride.

9. The process of claim 8 in which the epoxy compound is an epoxy resin in the form of a glycidyl ether of a poly-phenol epoxy resin.

10. The process of claim 5 in which the substrate is an automobile body and the composition applied thereto has a solvent content of no greater than 5.0%, the composition being applied at points where imperfections in the body appear, smoothing the applied composition, curing the same, and if necessary mechanically removing excess portions thereof.

11. The process of claim 6 in which the substrate is an automobile body and the composition applied thereto has a solvent content of no greater than 5.0%, the composition being applied at points where imperfections in the body appear, smoothing the applied composition, curing the same, and if necessary mechanically removing excess portions thereof.

12. The process of claim 7 in which the substrate is an automobile body and the composition applied thereto has a solvent content of no greater than 5.0%, the composition being applied at points where imperfections in the body appear, smoothing the applied composition, curing the same, and if necessary mechanically removing excess portions thereof.

13. The process of claim 8 in which the substrate is an automobile body and the composition applied thereto has a solvent content of no greater than 5.0%, the composition being applied at points where imperfections in the body appear, smoothing the applied composition, curing the same, and if necessary mechanically removing excess portions thereof.

14. The process of claim 9 in which the substrate is an automobile body and the composition applied thereto has a solvent content of no greater than 5.0%, the composition being applied at points where imperfections in the body appear, smoothing the applied composition, curing the same, and if necessary, mechanically removing excess portions thereof.

* * * * *